Patented June 28, 1949

2,474,206

UNITED STATES PATENT OFFICE 2,474,206

PRODUCTION OF VINYL CHLORIDE

Willem Leendert Johannes de Nie, Amsterdam, Netherlands, assignor to Shell Development Company, San Francisco, Calif., a corporation of Delaware No Drawing. Application July 21, 1947, Serial No. 762,535. In the Netherlands October 5, 1943

Section 1, Public Law 690, August 8, 1946
Patent expires October 5, 1963

5 Claims. (Cl. 260—656)

This invention relates to improvements in the production of vinyl chloride from ethylene dichloride and acetylene.

In accordance with the present invention, ethylene dichloride is subjected to pyrolytic decomposition to vinyl chloride and hydrogen chloride, acetylene is added to the decomposition products, and the hydrogen chloride and acetylene are catalytically combined to form vinyl chloride.

It is known to produce vinyl chloride by the pyrolysis of ethylene dichloride (1,2-dichloroethane). The ethylene dichloride pyrolysis is generally effected by the passage of ethylene dichloride through an externally heated zone comprising, for example, a reactor of restricted cross-sectional area, optionally packed with suitable material such as fire-clay, pumice, silica stone, crushed fire-brick, or the like. Temperatures employed will generally vary to some degree with particular operating conditions employed. Suitable pyrolysis conditions comprise, for example, the passage of the ethylene dichloride through a pyrolyzing zone containing a suitable catalytic agent, such as chamotte, at a temperature in the neighborhood of about 500° C. When executing the pyrolysis in the absence of contact material having any appreciable catalytic effect, somewhat higher temperatures, for example, from about 575° C. to about 600° C. are generally employed. Products of pyrolysis will comprise besides vinyl chloride, hydrogen chloride, as well as generally a certain amount of unconverted dichloroethane and some by-products.

The catalytic combination of hydrogen chloride and acetylene to form vinyl chloride is also known. Catalysts which may be employed include adsorptive material such as silica gel, activated carbon, and the like, impregnated with a mercuric compound, for example, mercuric chloride, and optionally containing an alkali and/or alkaline earth metal chloride. Such catalytic combination of hydrogen chloride with acetylene is generally conducted at a moderately elevated temperature, for example, in the range of from about 180° to about 250° C., preferably in the neighborhood of about 200° C. Other suitable hydrochlorinating conditions comprise the use of a catalyst comprising a halide of antimony or bismuth in the liquid state, at a somewhat lower temperature, for example, below about 100° C.

In order to attain yields commensurate with practical operating conditions in the execution of the catalytic hydrochlorination of acetylene to vinyl chloride, it is imperative that the reaction be carried out under substantially anhydrous conditions and that, therefore, all materials charged to the reaction zone be dry, or free of any substantial amount of moisture.

Removal of moisture from acetylene is generally a relatively simple operation even in large scale processes. However, the obtaining of hydrogen chloride sufficiently free of moisture to assure efficient operation of the process is generally fraught with difficulties and operational complexities, which detract materially from efficient practical scale operation of the process.

Attempts have been made to obviate the difficulties inherent in drying available aqueous hydrogen chloride by the utilization of dry hydrogen chloride obtained by reacting dry hydrogen with chlorine under substantially anhydrous conditions. The generally high cost of such anhydrous material when available as such, taken together with the uncertainty with regard to regularity of its availability, additional cost occasioned by the need for compression, shipment, storage, and the like, render the use of anhydrous hydrogen chloride from a source remote from the vinyl chloride producing process highly uneconomical.

Production of the anhydrous hydrogen chloride by such method at the place of its utilization, although avoiding some of the difficulties, would entail the need for apparatus and additional operative steps which would render prohibitive the cost of initial installation, as well as subsequent operation, of the vinyl chloride manufacturing system comprising it.

It has now been found that the above difficulties are obviated to at least a substantial degree, and the efficient production of vinyl chloride from acetylene and hydrogen chloride is brought within the realm of practicability, by utilization in the process of the hydrogen chloride-containing products obtained in the pyrolysis of ethylene dichloride.

In accordance with the invention ethylene dichloride is subjected to pyrolyzing conditions in a first reaction zone, thereby forming pyrolysis products comprising hydrogen chloride and vinyl chloride. Acetylene is combined with effluence from the first reaction zone and the mixture subjected in a second reaction zone to acetylene hydrochlorinating conditions effecting the interaction of hydrogen chloride and acetylene with the formation of reaction products comprising vinyl chloride.

Assurance of the anhydrous state of the ethylene dichloride pyrolysis products is readily obtained by the subjection of the ethylene dichloride charge to conventional means capable of removing water therefrom should this be necessary. Such moisture removing means may comprise, for example, one or more such steps as distillation, contact with suitable adsorbent or drying agents such as activated alumina, calcium chloride, calcium sulphate, and the like.

The products of the ethylene dichloride pyrolysis comprising vinyl chloride and hydrogen chloride are combined as such, without the need for intermediate processing, with the acetylene and subjected to the catalytic acetylene hydrochlorinating conditions. The surprising and highy unexpected discovery was made that the components, other than hydrogen chloride, which are present in the ethylene dichloride pyrolysis products, such as, for example, vinyl chloride and some unconverted ethylene dichloride, are in no wise affected to any substantial degree by the reaction conditions necessitated in the acetylene hydrochlorinating zone, and that the activity of the catalysts employed in the acetylene hydrochlorinating zone are in no wise adversely affected by their contact under the acetylene hydrochlorinating conditions with the total products from the ethylene dichloride pyrolysis.

If desired at least a part of the vinyl chloride and/or unconverted ethylene dichloride in the ethylene pyrolysis products may be removed therefrom by conventional means prior to combining the hydrogen chloride-containing pyrolysis products with the acetylene. Such removal of a part of the components from the ethylene dichloride pyrolysis products may involve one or more such conventional steps as, for example, distillation, compression, solvent extraction, contact with adsorbents such as activated alumina, clay, charcoal, and the like. Substantially improved efficiency of operation is obtained, however, by the combination of the acetylene with the total products of the ethylene dichloride pyrolysis as such, and the subjection of substantially the entire resulting mixture to the acetylene dehydrochlorinating conditions. Such direct utilization of the total ethylene dichloride product, as such, entails advantages comprising, for example, the complete elimination of the relatively costly equipment required for manipulation of pyrolysis products during intermediate processing prior to their combination with the acetylene and subjection to the acetylene hydrochlorinating conditions. It is furthermore apparent that there is considerable advantage in the curtailment of the amount of equipment which must be brought into contact with hydrogen chloride-containing materials.

Further advantages in the use of the two step process of the invention utilizing the total ethylene dichloride pyrolysis products as such are the availability of the heat content thereof and the absence of any need for pumping means to transport the pyrolysis products from the pyrolysis reaction zone to the hydrohalogenation reaction zone because of the substantial increment in pressure encountered between inlet and outlet of the pyrolyzing zone. It is furthermore apparent that in addition to providing a highly economical source of anhydrous hydrogen chloride within the system proper the process provides a method of operation greatly facilitating the recovery of substantially pure vinyl chloride from the final reaction products because of its high degree of concentration thereon. The following example is illustrative of the method of producing vinyl chloride in accordance with the invention:

*Example*

Ethylene dichloride (1,2 - dichloroethane), purified by fractionation, was passed through a tubular, iron reactor having an inside diameter of 7 cm. and a length of 300 cm., at a rate of 3.5 liters (4.4 kg.) of ethylene dichloride per hour. The tubular reactor was filled with chamotte and immersed in a molten salt bath which was maintained at a temperature of 515° C.

Under the above defined conditions a conversion of 85% by weight of the ethylene dichloride charged was obtained. The reaction products were introduced into a partial condenser wherein a substantial part of the unconverted ethylene dichloride was condensed. Condensed unconverted ethylene dichloride was withdrawn therefrom. The remaining gaseous reaction products obtained at a rate of about 1850 liters per hour consisted of about 46 percent by weight of vinyl chloride and about 50 percent by volume of hydrogen chloride. To these remaining gaseous reaction products there was added dry acetylene gas at the rate of 900 liters per hour. The resulting gaseous mixture was passed through a reaction vessel having a capacity of 50 liters and containing a catalyst consisting of mercuric chloride deposited upon silica gel. The catalyst was prepared by subliming $HgCl_2$ at a temperature of about 225° C. on silica gel in a stream of carbon dioxide. The reaction of hydrogen chloride with acetylene was effected at a temperature of about 200° C. Care was taken to avoid overheating.

Effluence from the second reactor was scrubbed with water at room temperature (to remove any remaining traces of hydrogen chloride). The scrubbed gas was compressed to a pressure of about 5 atm. to effect the liquefaction of the vinyl chloride. A yield of about 4.7 kg. of crude vinyl chloride per hour was obtained.

The invention claimed is:

1. The process of producing vinyl chloride which comprises subjecting ethylene dichloride to pyrolytic decomposition with production of a mixture of vinyl chloride and hydrogen chloride, adding acetylene to the mixture and subjecting the resulting mixture to catalytic reaction to combine acetylene with the hydrogen chloride.

2. The process of producing vinyl chloride which includes subjecting ethylene dichloride to pyrolysis to form vinyl chloride and hydrogen chloride, adding acetylene to the products of such pyrolysis and catalytically reacting the acetylene with the hydrogen chloride in the mixture.

3. The process of producing vinyl chloride which includes reacting acetylene with hydrogen chloride in the presence of the products of pyrolysis of ethylene dichloride.

4. The process for the production of vinyl chloride which comprises subjecting ethylene dichloride to pyrolyzing conditions effecting the pyrolysis of ethylene dichloride to vinyl chloride and hydrogen chloride, combining at least a part of said pyrolysis products with acetylene and subjecting the resulting mixture to hydrochlorinating conditions effecting the interaction of acetylene with hydrogen chloride with the formation of vinyl chloride.

5. The process of producing vinyl chloride which includes subjecting ethylene dichloride to pyrolysis to form vinyl chloride and hydrogen chloride, adding acetylene to the products of such pyrolysis and subjecting the resulting acetylene-containing mixture to catalytic hydrochlorinating conditions effecting the interaction of acetylene with hydrogen chloride with the formation of reaction products comprising vinyl chloride.

WILLEM LEENDERT JOHANNES DE NIE.

REFERENCES CITED

The following references are of record in the file of this patent:

UNITED STATES PATENTS

| Number | Name | Date |
| --- | --- | --- |
| 2,412,308 | Weiler | Dec. 10, 1946 |